(12) United States Patent
Horii

(10) Patent No.: US 12,384,298 B2
(45) Date of Patent: Aug. 12, 2025

(54) PARKING ASSISTANCE SYSTEM AND PARKING ASSISTANCE METHOD

(71) Applicant: CANON KABUSHIKI KAISHA, Tokyo (JP)

(72) Inventor: Yuya Horii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 18/333,326

(22) Filed: Jun. 12, 2023

(65) Prior Publication Data
US 2023/0415574 A1    Dec. 28, 2023

(30) Foreign Application Priority Data

Jun. 22, 2022 (JP) ................................. 2022-100603

(51) Int. Cl.
*B60K 35/00* (2024.01)
*B60R 1/26* (2022.01)
*B60K 35/28* (2024.01)

(52) U.S. Cl.
CPC ............... *B60K 35/00* (2013.01); *B60R 1/26* (2022.01); *B60K 35/28* (2024.01); *B60K 2360/173* (2024.01); *B60K 2360/176* (2024.01); *B60R 2300/305* (2013.01); *B60R 2300/306* (2013.01); *B60R 2300/806* (2013.01)

(58) Field of Classification Search
None
See application file for complete search history.

(56) References Cited

U.S. PATENT DOCUMENTS 11,776,407 B2 * 10/2023 Gaß .................... B60K 35/80
340/932.2

FOREIGN PATENT DOCUMENTS

JP        2010260494 A    11/2010

* cited by examiner

*Primary Examiner* — K. Wong
(74) *Attorney, Agent, or Firm* — Canon U.S.A., Inc. IP Division

(57) ABSTRACT

A parking assistance system includes a rear-view image capturing unit that captures an image of an upper rear area behind a vehicle, a detection unit that detects information regarding a cargo on the vehicle using the captured image, an image display unit configured to display the captured image and display a guideline for assisting parking of the vehicle in the display of the captured image, and a guideline display control unit configured to control a display position of the guideline in the display of the captured image based on the detected information regarding the cargo.

14 Claims, 9 Drawing Sheets

PARKING ASSISTANCE SYSTEM AND PARKING ASSISTANCE METHOD

FIELD

The present disclosure relates to a parking assistance system of a vehicle and a parking assistance method for presenting a parking position.

DESCRIPTION OF THE RELATED ART

Apparatuses for assisting a driver's backward movement operation (reverse movement operation) of a vehicle at a time of parking includes a rear-view camera for capturing an image of an area behind the vehicle, and an image (video) display apparatus such as a rear-view monitor for presenting the captured rear-view image to a driver. Using such parking assistance apparatuses enables the driver to visually recognize the image of an area behind the vehicle via the rear-view monitor when the driver changes a shift lever to a reverse (back up) position, and to perform a safer parking operation of the vehicle. There is also a parking assistance apparatus with various functions for safety added thereto that display more than the image captured by the rear-view camera. For example, there is a function of rendering guidelines regarding a vehicle width and/or a back-up distance on the rear-view monitor enabling the driver to easily understand the perspective between a rear end of the vehicle and an obstacle on the rear side. In particular, the guideline rendered at a position nearest to the rear end of the vehicle suggests a possibility of the vehicle hitting the obstacle on the rear side if the driver continues to perform a backward movement beyond the guideline, and thus, serves as a guide at the time of parking. Japanese Patent Application Laid-open No. 2010-260494 discusses a parking assistance apparatus that renders a guideline at a position corresponding to a leading end of a rear side door to enable a driver to open the rear side door without worrying about hitting an obstacle in a case where it is determined that the rear side door of the vehicle could be opened after parking. This provides presenting information to the driver whether an obstacle with a possibility of being hit by the rear side door exists within an openable/closable range of the rear side door of the vehicle.

A vehicle can run with cargo loaded on the roof or a rear deck of the vehicle. In a case where the loaded cargo is long, the cargo can protrude past the front end and/or the rear end of the vehicle. In this case, the driver has to carefully drive the vehicle so that the protruding cargo does not hit any obstacle.

The above-described parking assistance system is used for the vehicle with respect to the cargo protruding rearward. Since the imaging angle-of-view of the rear-view camera for the parking assistance faces downward, the rear-view camera cannot capture an image of the cargo protruding rearward. Thus, if the driver performs a backward movement of the vehicle following the guideline rendered on the rear-view monitor in a case where the cargo protrudes rearward, the driver may not be able to park the vehicle at an appropriate position, and the vehicle may hit the obstacle.

SUMMARY

Aspects of the present disclosure are directed to a parking assistance system that assists a driver in performing an appropriate backward movement of a vehicle where a cargo loaded on the vehicle protrudes rearward from the vehicle.

According to an aspect of the present invention, a parking assistance system includes a rear-view image capturing unit configured to capture an image of an upper rear area behind a vehicle, a detection unit configured to detect information regarding a cargo on the vehicle using the captured image, an image display unit configured to display the captured image and display a guideline for assisting parking of the vehicle in the display of the captured image, and a guideline display control unit configured to control a display position of the guideline in the display of the captured image based on the detected information regarding the cargo.

Further features of the present disclosure will become apparent from the following description of exemplary embodiments with reference to the attached drawings.

DESCRIPTION OF THE EMBODIMENTS

Figure 1:
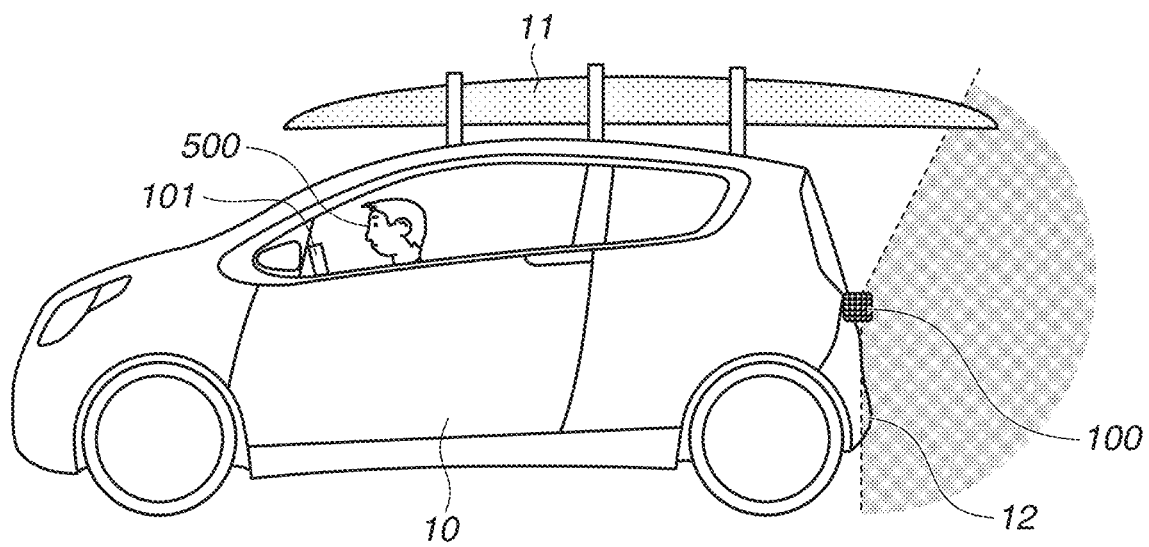
FIG. 1 is a diagram illustrating an example of a vehicle, a cargo on a roof of the vehicle, and a setting state of a wide-angle rear-view camera.

Hereinbelow, a parking assistance system according to exemplary embodiments will be described in detail with reference to the attached drawings. In the drawings, the same reference numerals are assigned to identical components, and duplicate descriptions thereof are omitted. The parking assistance system according to the exemplary embodiments can be implemented in various forms, and is not limited to the exemplary embodiments described in the present disclosure.

The parking assistance system according to an exemplary embodiment detects whether a cargo is present by activating a wide-angle rear-view camera when the engine of a vehicle is started. In a case where the parking assistance system detects a cargo protruding rearward from the vehicle, the parking assistance system calculates a protrusion amount. In a case where a backward movement of the vehicle is detected, the parking assistance system displays, on a rear-view monitor for parking assistance, a captured image of the cargo and controls the display position of a guideline based on the calculated protrusion amount.

The detection method according to the present exemplary embodiment of whether a cargo is present includes the parking assistance system determining that a cargo is present in a case where an object is captured at a certain position during a predetermined time or more in an image capturing angle-of-view of the wide-angle rear-view camera while the vehicle is moving. The parking assistance system calculates a rear side protrusion amount of the cargo based on a height distance between the rear-view camera and the cargo, and angle-of-view information indicating the angle-of-view where the image of the cargo is captured.

This method enables the driver to understand the perspective between the cargo and the obstacle on the rear side of the vehicle because the parking assistance system displays the image of the cargo on the roof of the vehicle at a time of parking the vehicle, and controls the display position of the guideline to correspond to the rear side protrusion amount of the cargo. Thus, the driver can appropriately park the vehicle at a time of the backward movement.

FIG. 1 is a diagram illustrating an example of a vehicle 10, a cargo 11 loaded on a roof of the vehicle 10, and a setting state of a wide-angle rear-view camera 100 according to an exemplary embodiment. The wide-angle rear-view camera 100 is mounted on a rear end of the vehicle 10, for example, above a rear bumper 12, and captures an image of an area behind the vehicle 10 in a wide angle after the vehicle's engine is started.

A camera capable of capturing an image in a range of, for example, 150 degrees in vertical angle-of-view is used as the wide-angle rear-view camera 100. The vehicle 10 is, for example, a passenger car or a commercial car (e.g., a truck or a bus), and is operated by a driver 500. A rear-view monitor 101 is an image (video) display apparatus for providing, to the driver 500, an image captured by the wide-angle rear-view camera 100 at a time the vehicle is moving in a backward direction, such as parking. The cargo 11 is, for example, a long object loaded on a roof or a rear deck of the vehicle 10, and can protrude rearward from the vehicle 10 exceeding the length of the vehicle 10. Examples of the cargo 11 include, but are not limited to, a timber pole, an iron pipe, or a surfboard.

Figure 2:
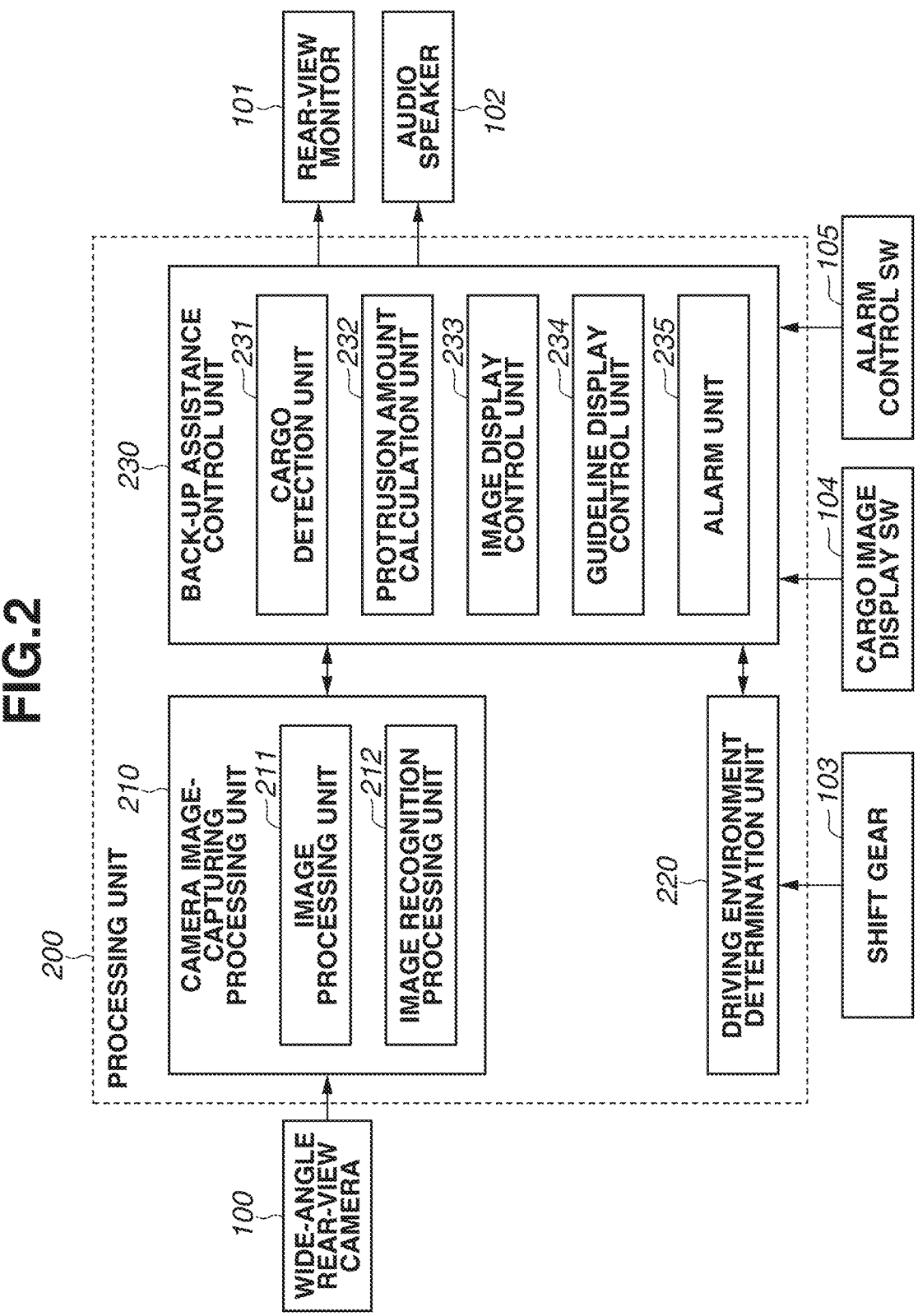
FIG. 2 is a block diagram illustrating an example of a configuration of a parking assistance system.

FIG. 2 is a block diagram illustrating an example of a configuration of the parking assistance system. A processing unit 200 includes a camera image-capturing processing unit 210, a driving environment determination unit 220, and a back-up assistance control unit 230.

The processing unit 200 includes a central processing unit (CPU) for performing calculation and control, a read only memory (ROM) serving as a main memory, and a random access memory (RAM), which are not illustrated in FIG. 2. The ROM stores basic setting data and a series of parking assistance processing programs according to the present exemplary embodiment. The CPU reads a program corresponding to a processing content and loads the program in the RAM to execute an operation of each block.

The camera image-capturing processing unit 210 includes an image processing unit 211 and an image recognition processing unit 212.

The image processing unit 211 develops an image signal transmitted from the wide-angle rear-view camera 100 into an image, and performs various kinds of processing such as wide dynamic range correction (WDR), gamma correction, distortion correction, and demosaic processing. The image recognition processing unit 212 performs detection processing of an object captured by the wide-angle rear-view camera 100 using an image signal output from the image processing unit 211. A deep learning method is used to detect the object. For example, it is preferable to use "You Only Look Once" (YOLO) that can be easily trained and is fast in detection. Another deep learning method, Single Shot MultiBox Detector (SSD), can be used. In addition, Faster Regional Convolution Neural Network (R-CNN), Fast R-CNN, or R-CNN can be used. The image recognition processing unit 212 performs object detection processing using the above-described recognition technique, and transmits a recognition result to the back-up assistance control unit 230.

The driving environment determination unit 220 communicates with a vehicle-mounted electronic control unit (ECU) (not illustrated) via an interface such as a controller area network (CAN) (not illustrated). This enables the driving environment determination unit 220 to obtain driving information indicating whether the vehicle 10 is moving forward or backward. Examples of a driving information acquisition method of the vehicle 10 includes, for example, the setting state of a shift gear 103, the speed of the vehicle 10, or the rotation direction of the vehicle's tires. From the acquisition result of the driving information, in a case where the driving environment determination unit 220 determines that the vehicle 10 is about to make a backward movement, the driving environment determination unit 220 outputs the determination result to the back-up assistance control unit 230.

The back-up assistance control unit 230 includes a cargo detection unit 231, a protrusion amount calculation unit 232, an image display control unit 233, a guideline display control unit 234, and an alarm unit 235. The cargo detection unit 231 determines whether a cargo protruding rearward from the vehicle 10 is present from among detected objects based on an object recognition result of the rear-view image output from the image recognition processing unit 212. The determination method of the cargo will be described in detail in step S603 in FIG. 6. The protrusion amount calculation unit 232 calculates how long the cargo 11 protrudes rearward from the vehicle 10 in a case where the cargo detection unit 231 determines that the cargo 11 protruding rearward from the vehicle 10 is present. The calculation method of a cargo protrusion amount will be described in detail in step S605 in FIG. 6. The presence of the cargo 11, and/or the rear side protrusion amount can be determined based on a manual operation by the driver 500. For example, in a case where it is difficult to capture an image of an upper rear area behind the vehicle 10 due to the restriction of the mounting position of the wide-angle rear-view camera 100, it is preferable to set cargo information manually.

Figure 3:
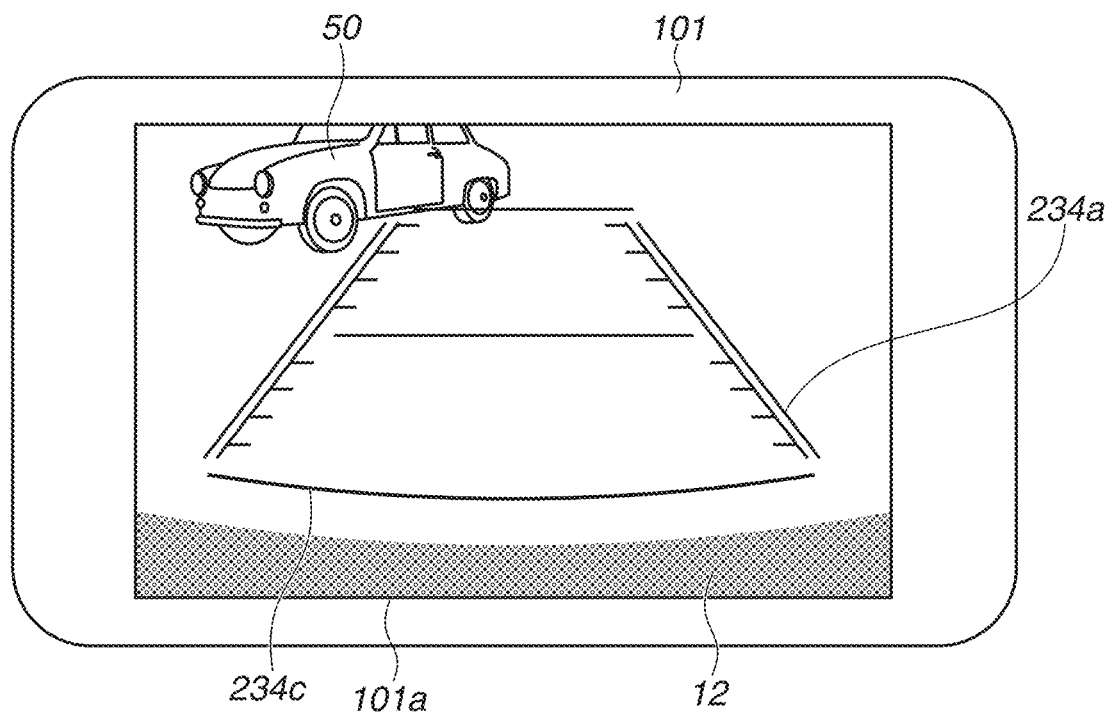
FIG. 3 is a diagram illustrating an example of a rear-view monitor screen displayed at a time of a general backward movement without the cargo loaded on the roof of the vehicle.

FIG. 3 illustrates an example of a guideline display at a time of general backward movement in a case where no cargo is loaded. In a case where the driving environment determination unit 220 determines that the vehicle 10 is about to make a backward movement, the image display control unit 233 cuts out the lower part of the angle-of-view of the image captured by the wide-angle rear-view camera 100 to display a rear-view image 101a for parking assistance on the rear-view monitor 101. The image display control unit 233 renders a guideline 234a relating to the width or back-up distance of the vehicle 10 on the rear-view image 101a.

As described, in a case where the cargo detection unit 231 determines that the cargo 11 is present, the guideline display control unit 234 controls the display position of the guideline 234a in the rear-view image 101a on the rear-view monitor 101 based on the calculated protrusion amount.

Figure 4:
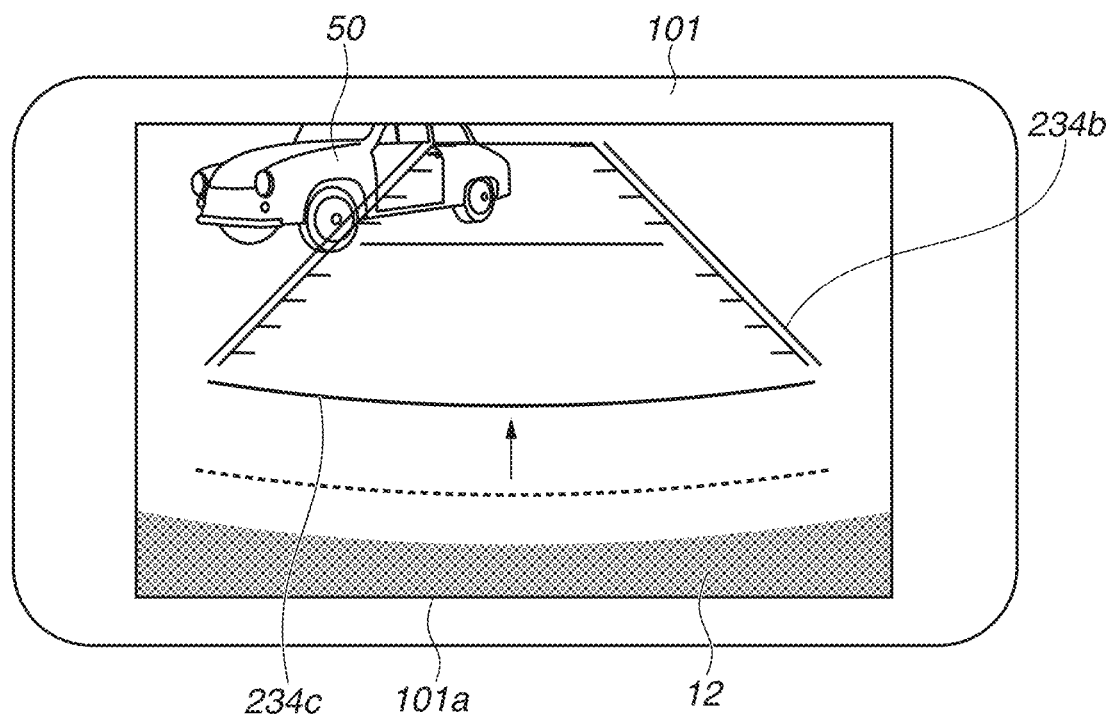
FIG. 4 is a diagram illustrating an example of a display position control of a guideline at a time of the backward movement with the cargo loaded on the roof of the vehicle.

FIG. 4 illustrates an example of the display position control of the guideline at a time of the backward movement in a case where the cargo 11 is present. For example, in a case where the protrusion amount calculation unit 232 calculates that the cargo 11 on the roof of the vehicle 10 protrudes rearward from the rear end of the vehicle 10 by 50 cm, the guideline display control unit 234 performs processing to render the guideline 234a illustrated in FIG. 3 to be shifted backward by 50 cm as illustrated by a guideline 234b in FIG. 4 from the normal display position.

It is possible to prevent the vehicle 10 and the cargo 11 from hitting an obstacle behind the vehicle 10 by the driver performing the backward movement so that a distance indication line 234c does not hit the obstacle 50 behind the vehicle 10. The guidelines 234a and 234b can be displayed in an estimated moving direction of the vehicle based on the turning state of the vehicle's steering wheel, or in the current straight-ahead direction of the vehicle 10.

Figure 5:
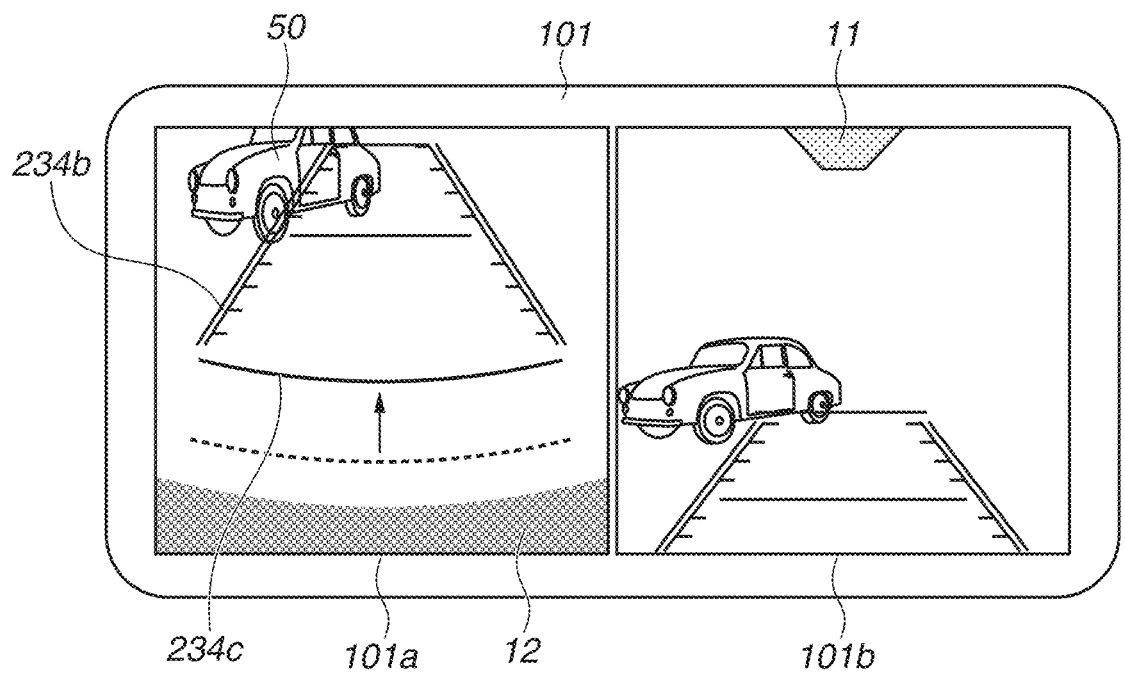
FIG. 5 is a diagram illustrating an example of an image display form of the cargo displayed at a time of the backward movement.

FIG. 5 illustrates an example of a display form of a wide-angle rear-view image 101b including the cargo 11. As illustrated in FIG. 5, the image display control unit 233 enables the driver 500 to easily recognize the cargo 11 on the roof of the vehicle 10. For example, the image display control unit 233 displays the wide-angle rear-view image 101b including the cargo 11 in a juxtaposed manner with the rear-view image 101a, which is an image of a lower part of an area behind the vehicle 10 that is cut out from the image captured by the wide-angle rear-view camera 100. In a case where the cargo detection unit 231 detects the cargo 11 on the roof of the vehicle 10, the display is performed using the above-described image display form as a default. The above-described image display form can be switched between enabled and disabled by a cargo image display SW 104 that can be selected by the driver 500, which will be described in detail in step S704 in FIG. 7.

In a case where the back-up assistance control unit 230 determines that the cargo 11 is present on the roof of the vehicle 10 and the vehicle 10 will make the backward movement, the alarm unit 235 alerts the driver 500, via an audio speaker 102, of a possibility of the cargo 11 hitting an obstacle by, for example, announcing "The cargo protrudes rearward by 50 cm. Please carefully back up the vehicle." The above-described alarm form can be switched between enabled and disabled by an alarm control SW 105 that can be selected by the driver 500, and will be described in detail in step S706 in FIG. 7. The cargo image display SW 104 and the alarm control SW 105 can be, for example, software switches displayed on the rear-view monitor 101 or physical switches arranged near the rear-view monitor 101. The alarm unit 235 can notify the driver 500 of the possibility of the cargo 11 hitting an obstacle using textual information such as "Back up the car carefully so that the cargo does not hit an obstacle."

The CPU in the processing unit 200 reads and executes a parking assistance processing program stored in the ROM to perform computer processing to implement the elements of the camera image-capturing processing unit 210, the driving environment determination unit 220, and the back-up assistance control unit 230. A series of procedures of the parking assistance processing will be described with reference to flowcharts in FIGS. 6 and 7.

Figure 6:
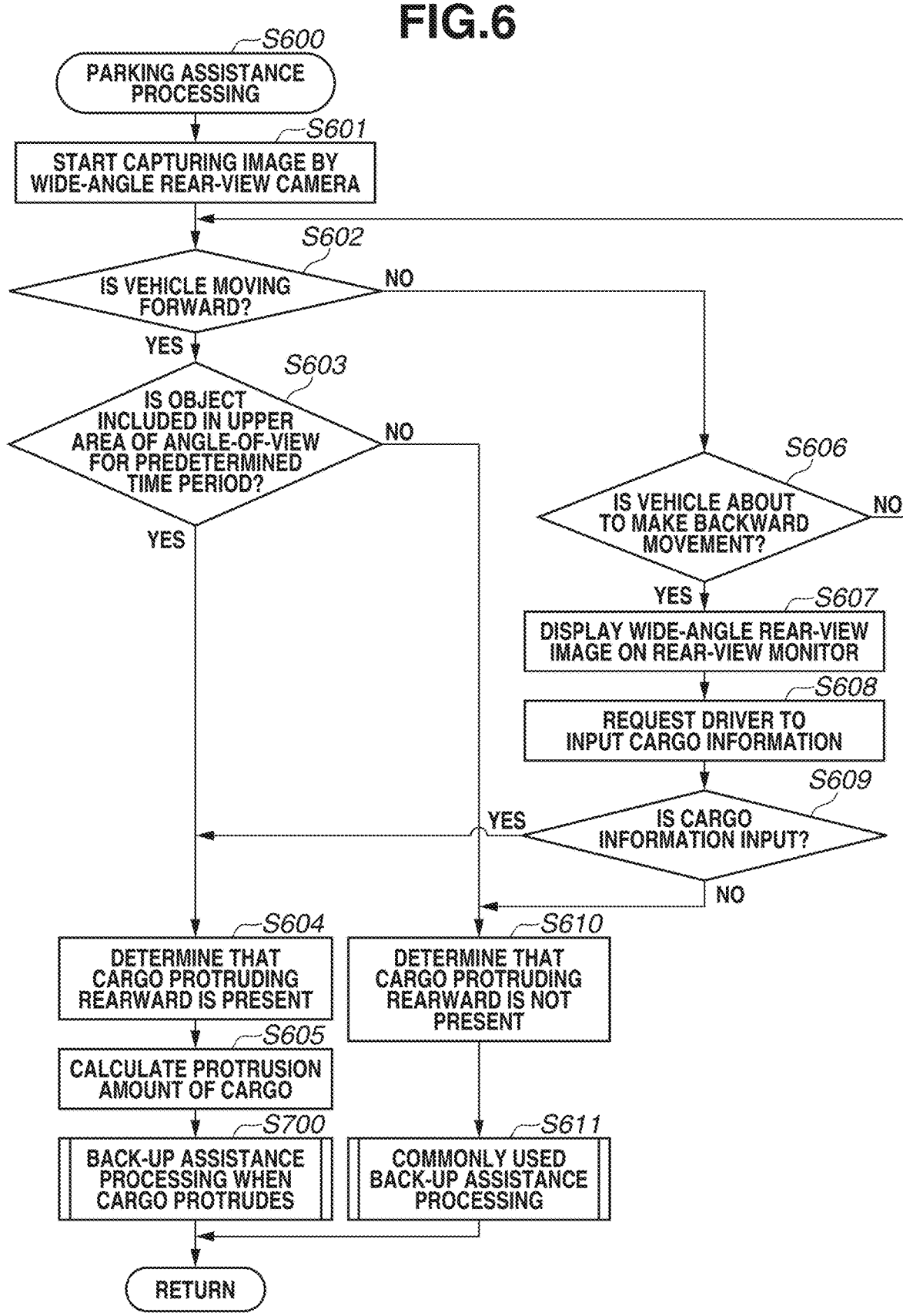
FIG. 6 is a flowchart illustrating an example of parking assistance processing.

FIG. 6 is a flowchart illustrating an example of parking assistance processing S600 performed by the CPU in the processing unit 200. In step S601, when a power source of the vehicle 10 (e.g., engine) is started, the wide-angle rear-view camera 100 starts capturing an image of an area behind the vehicle 10.

In step S602, the driving environment determination unit 220 determines whether the vehicle 10 is moving forward. Examples of a moving state determination method include a method of determining whether the shift gear 103 is in a "Drive" position, or whether the tires are rotating in the forward direction of the vehicle 10. In a case where the driving environment determination unit 220 determines that the vehicle 10 is moving forward (YES in step S602), the processing proceeds to step S603. In a case where the driving environment determination unit 220 determines that the vehicle 10 is not moving forward (NO in step S602), the processing proceeds to step S606.

In step S603, the image recognition processing unit 212 outputs, to the cargo detection unit 231, the recognition result of objects captured in the angle-of-view of the wide-angle rear-view camera 100, and the cargo detection unit 231 determines whether a cargo protruding rearward from the vehicle 10 is present in a group of detected objects. In general, in a case where the vehicle 10 is moving forward, the image captured by the wide-angle rear-view camera 100 constantly changes depending on the surrounding landscape. Thus, in a case where the wide-angle rear-view camera 100 continues taking a frame difference for a predetermined time period (e.g., 30 seconds) or more while the vehicle 10 is moving, and an image of an object is captured in an upper area of the angle-of-view in the image captured by the wide-angle rear-view camera 100 without any change, the cargo detection unit 231 determines that the object is the cargo 11 on the roof of the vehicle 10. Examples of a recognition method of the cargo 11 include a semantic segmentation method using a deep learning method. By performing the semantic segmentation method, the cargo detection unit 231 can appropriately detect the presence/absence of the cargo 11 as well as a cargo region (shape) in the image. A blue sky can be an example of a false detection target of the cargo 11, but the blue sky can be determined by a sky detection technique using a deep learning method, or object recognition processing on traffic lights and buildings hiding the blue sky while the vehicle 10 is moving. Using the above-described method, in a case where the cargo detection unit 231 determines that an object is included in the upper area of the angle-of-view of the wide-angle rear-view camera 100 for a predetermined time period (YES in step S603), the processing proceeds to step S604. In a case where the cargo detection unit 231 determines that an object is not included in the upper area of the angle-of-view of the wide-angle rear-view camera 100 (NO in step S603), the processing proceeds to step S610. The above-described cargo presence/absence determination method is useful only when the vehicle 10 is moving forward and the surrounding landscape constantly changes. The cargo detection method in a case where the vehicle 10 does not move forward and moves backward after the engine starts will be described in detail in step S608.

In step S604, the cargo detection unit 231 determines that the cargo 11 protrudes rearward from the vehicle 10, and outputs, to the protrusion amount calculation unit 232, the angle-of-view information regarding the angle-of-view in which the image of the cargo 11 is captured by the wide-angle rear-view camera 100.

Figure 8:
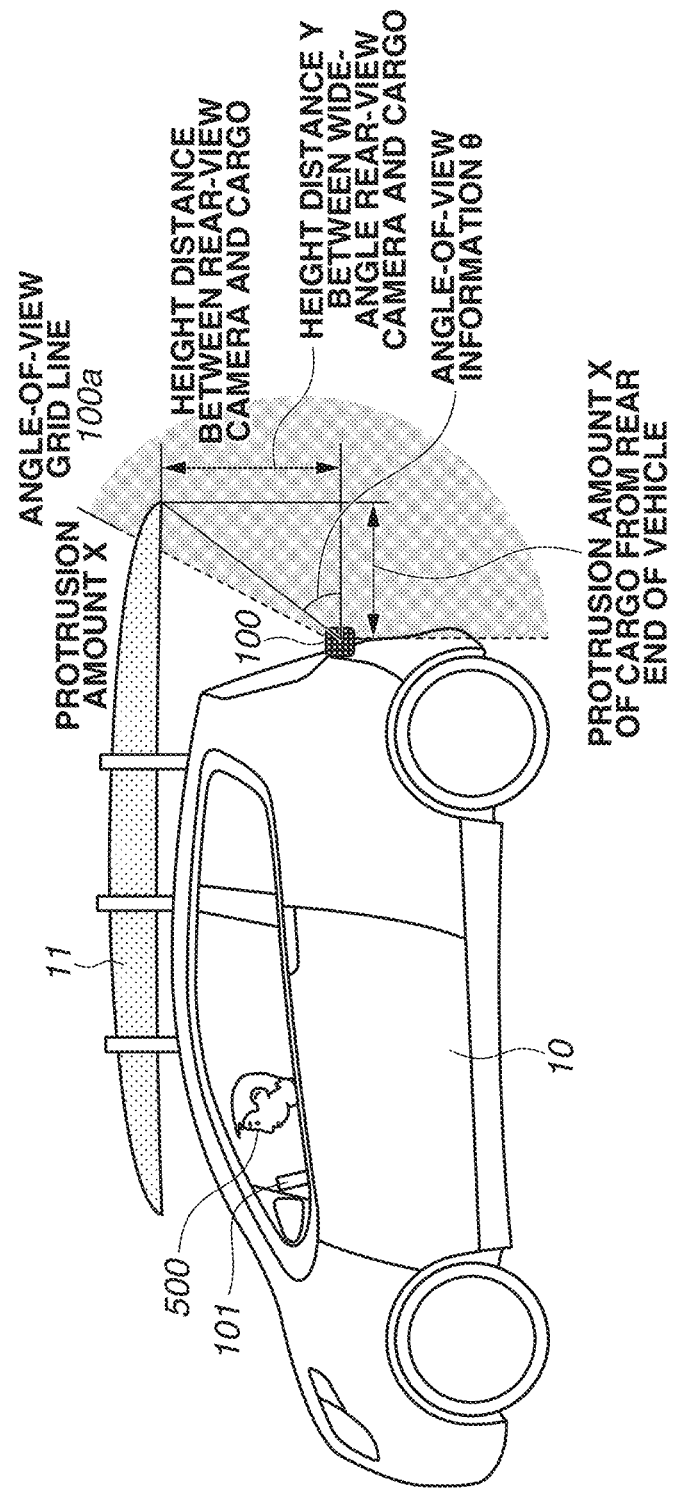
FIG. 8 is a diagram illustrating an example of a state of the vehicle when a protrusion amount of the cargo on the roof of the vehicle is calculated.

In step S605, the protrusion amount calculation unit 232 calculates how far the cargo 11 protrudes from the rear end of the vehicle 10. FIG. 8 illustrates an example of a state of the vehicle 10 when the protrusion amount of the cargo 11 is calculated according to the present exemplary embodiment. An equation (1) is an equation for calculating a protrusion amount X of the cargo 11 according to the present exemplary embodiment:

$$X = Y/\tan\theta \qquad (1)$$

X: protrusion amount of the cargo 11 from the rear end of the vehicle 10

Figure 9:
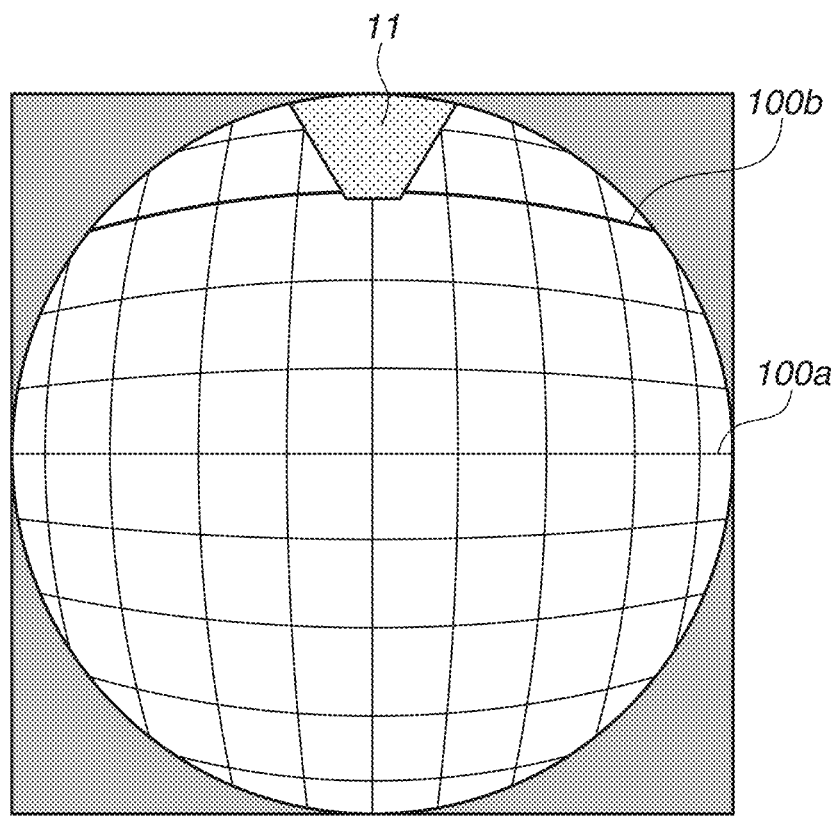
FIG. 9 is a diagram illustrating an example of an image form of an entire angle-of-view captured by the wide-angle rear-view camera.

Y: height distance between the wide-angle rear-view camera 100 and the cargo 11

θ: angle-of-view information indicated by a grid line 100b in FIG. 9 at which the image of the cargo 11 is captured. The processing then proceeds to S700.

As indicated by the equation (1), the rear side protrusion amount X of the cargo 11 is calculated from the height distance Y between the wide-angle rear-view camera 100 and the cargo 11, and the angle-of-view information θ (angle between the horizontal direction and a hypothetical line connecting the wide-angle rear-view camera 100 and the cargo 11) indicated by the grid line 100b in FIG. 9, at which the image of the cargo 11 is captured. As illustrated in FIG. 8, in a case where the cargo 11 protrudes from the vehicle roof substantially horizontally (a case where the rear end of the cargo 11 is located at the same height as that of the upper end of the vehicle roof), the height of the cargo 11 can be considered to be equivalent to the height of the vehicle 10. In this case, a value registered in advance as vehicle information is used as the height distance Y between the vehicle 10 and the wide-angle rear-view camera 100.

FIG. 9 illustrates an example of an image form of the entire angle-of-view captured by the wide-angle rear-view camera 100. As illustrated in FIG. 9, the angle-of-view information θ indicated by the grid line 100b at which the image of the cargo 11 is captured is obtained from an intersection point of a grid line 100a of the image capturing angle-of-view and an edge position of the cargo 11 subjected to the recognition processing by the image recognition processing unit 212. For example, in a case where the height distance between the wide-angle rear-view camera 100 and the vehicle roof is Y=70 cm, and the angle-of-view grid line 100b at which the image of the cargo 11 is captured is θ=+60 degrees in the vertical direction, the protrusion amount of the cargo 11 can be calculated to be approximately 40 cm using the equation (1).

In a case where the cargo 11 does not protrude substantially horizontally from the vehicle roof (e.g., a case where a long cargo is loaded in an obliquely upward inclined state, or a case where the rear end of the cargo is curved upward or downward), the height of the cargo 11 cannot be considered to be equivalent to the vehicle height. Thus, the protrusion amount calculation unit 232 does not calculate the protrusion amount of the cargo 11 based on the image captured by the wide-angle rear-view camera 100. For this reason, in a case where it is determined that the protrusion amount calculation unit 232 does not calculate the protrusion amount of the cargo 11 based on the image captured by the wide-angle rear-view camera 100, the protrusion amount is calculated based on the detected height of the cargo 11 from the ground level. Examples of a method of detecting the height of the cargo 11 from the ground level include a method of detecting by a distance measurement apparatus such as a three-dimensional light detection and ranging (3D-LiDAR), an ultrasonic sensor, a monocular camera, and a stereo camera, all of which are not illustrated, provided on the rear end of the vehicle 10. A method of obtaining the distance in the height direction from the road surface to the cargo 11 by any of these apparatuses is provided to measure the distance. The processing proceeds, based on the cargo protrusion amount calculated using any of the above-described methods, to the back-up assistance processing S700 (illustrated in FIG. 7) when the cargo 11 protrudes. The determination whether the protruding direction of the cargo 11 from the vehicle roof is substantially horizontal or not is performed by, for example, the wide-angle rear-view camera 100 capturing an image of the cargo 11 and the cargo detection unit 231 recognizing the captured image. The determination whether the cargo 11 protrudes substantially horizontally can be performed by a 3D-LiDAR or an ultrasonic sensor provided on the rear end of the vehicle 10 to measure the loading state in a 3-dimensional manner. The determination whether the cargo 11 protrudes substantially horizontally can be performed by a user inputting the loading state via the rear-view monitor 101.

In the above-described exemplary embodiment, how the cargo 11 protrudes is determined based on the height of the vehicle roof. The determination can also be based on, for example, the height of a luggage rack on the vehicle's roof.

In step S606, the driving environment determination unit 220 determines whether the vehicle 10 is about to make a backward movement. Examples of a backward movement determination method include a method of determining whether the shift gear 103 is in a reverse position and whether the tires are rotating in the backward direction of the vehicle 10. In a case where the backward movement of the vehicle 10 is detected (YES in step S606), the processing proceeds to step S607. In a case where the backward movement of the vehicle 10 is not detected (NO in step S606), the processing returns to step S602.

In step S607, the image display control unit 233 displays, on the rear-view monitor 101, the rear-view image 101a for parking assistance cut out to include an angle-of-view of the lower side as illustrated in FIG. 5. At this time, as illustrated in FIG. 5, the wide-angle rear-view image 101b with which the upper area can be visually recognized is also displayed in a juxtaposed manner with the rear-view image 101a.

In step S608, the cargo detection unit 231 requests the driver 500 to provide information whether the cargo 11 is present on the roof of the vehicle 10. Examples of a cargo information request method include displaying the wide-angle rear-view image 101b on the rear-view monitor 101 and requesting the driver 500 to touch a position thereon corresponding to the cargo or requesting the driver 500 to input an approximate protrusion amount of the cargo 11 as numerical information. An audio notification via the audio speaker 102 or a display of request contents on the rear-view monitor 101 as textual information can be used when the cargo detection unit 231 requests the driver 500 to provide cargo information.

In step S609, the cargo detection unit 231 determines whether the driver 500 has provided the cargo information. In a case where the cargo information is input (YES in step S609), the processing proceeds to step S604. In a case where the cargo information is not input (NO in step S609), the processing proceeds to step S610.

In step S610, the cargo detection unit 231 determines that the cargo 11 does not protrude rearward from the vehicle 10, and the processing proceeds to step S611. In step S611, back-up assistance control unit 230 performs a commonly used back-up assistance processing as illustrated in FIG. 3 when the vehicle 10 is parked.

The sequence of the cargo protrusion determination processing in steps S601 to S610 is described above. There is a possibility of movement or displacement of the cargo 11 caused by vibration while the vehicle 10 is running. For this reason, during the cargo protrusion determination processing, the wide-angle rear-view camera 100 is constantly turned on to perform the calculation processing of the protrusion amount of the cargo 11 while the vehicle 10 is moving. Then, in a case where the protrusion amount changes from the previously calculated protrusion amount, multi-thread processing to update the protrusion amount can be performed each time.

The back-up assistance processing in step S700 performed when the cargo 11 protrudes rearward from the vehicle 10 will be described with reference to FIG. 7. In step S701, the driving environment determination unit 220 determines whether the vehicle 10 is about to make a backward movement. The determination method of the backward movement is described above with respect to step S606. In a case where the backward movement of the vehicle 10 is detected (YES in step S701), the processing proceeds to step S702. In a case where the backward movement of the vehicle 10 is not detected (NO in step S701), the processing in step S701 is repeated until the backward movement is detected.

In step S702, the image display control unit 233 displays, on the rear-view monitor 101, the rear-view image 101a for parking assistance cut out to include an angle-of-view of the lower side, as illustrated in FIG. 3.

In step S703, the guideline display control unit 234 determines a shift amount of the guideline 234a corresponding to the rear side protrusion amount X of the cargo 11 calculated by the protrusion amount calculation unit 232. This enables, as illustrated in FIGS. 3 and 4, the display position of the guideline 234a rendered on the rear-view monitor 101 to be shifted backward. The larger the rear side protrusion amount X is, the larger the shift amount of the guideline 234a is. This facilitates the driver 500 understanding whether the obstacle 50 behind the vehicle 10 is present within a rear side protrusion range of the cargo 11.

In step S704, the image display control unit 233 determines whether the cargo image display SW 104 is on. In a case where the cargo image display SW 104 is on (YES in step S704), the processing proceeds to step S705. In a case where the cargo image display SW 104 is not on (NO in step S704), the processing proceeds to step S706.

In step S705, as illustrated in FIG. 5, the image display control unit 233 displays the wide-angle rear-view image 101b including the cargo 11 in a juxtaposed manner with the normal rear-view image 101a. This enables the driver 500 to perform the backward movement while visually recognizing the cargo 11 on the roof of the vehicle 10. Thus, the driver 500 can safely park the vehicle 10.

In step S706, the alarm unit 235 determines whether the alarm control SW 105 is on. In a case where the alarm control SW 105 is on (YES in step S706), the processing proceeds to step S707. In a case where the alarm control SW 105 is not on (NO in step S706), the processing proceeds to step S708.

In step S707, the alarm unit 235, using the audio speaker 102, notifies the driver 500 of the possibility of the cargo hitting an obstacle. Thus, even in the case of the driver 500 performing the backward movement without checking the rear-view monitor 101, the driver 500 can recognize the presence of the cargo 11 and can safely park the vehicle 10.

In step S708, the driving environment determination unit 220 determines whether the vehicle 10 ends the backward movement. In a case where the end of the backward movement is detected (YES in step S708), the processing proceeds to step S709. In a case where the end of the backward movement is not detected (NO in step S708), the processing returns to step S704.

In step S709, the image display control unit 233 ends the image display on the rear-view monitor 101. After step S709, the execution of a sequence of the back-up assistance processing in the case where the cargo 11 protrudes rearward ends, and the processing is re-executed from step S601 in preparation for the next backward movement.

Figure 7:
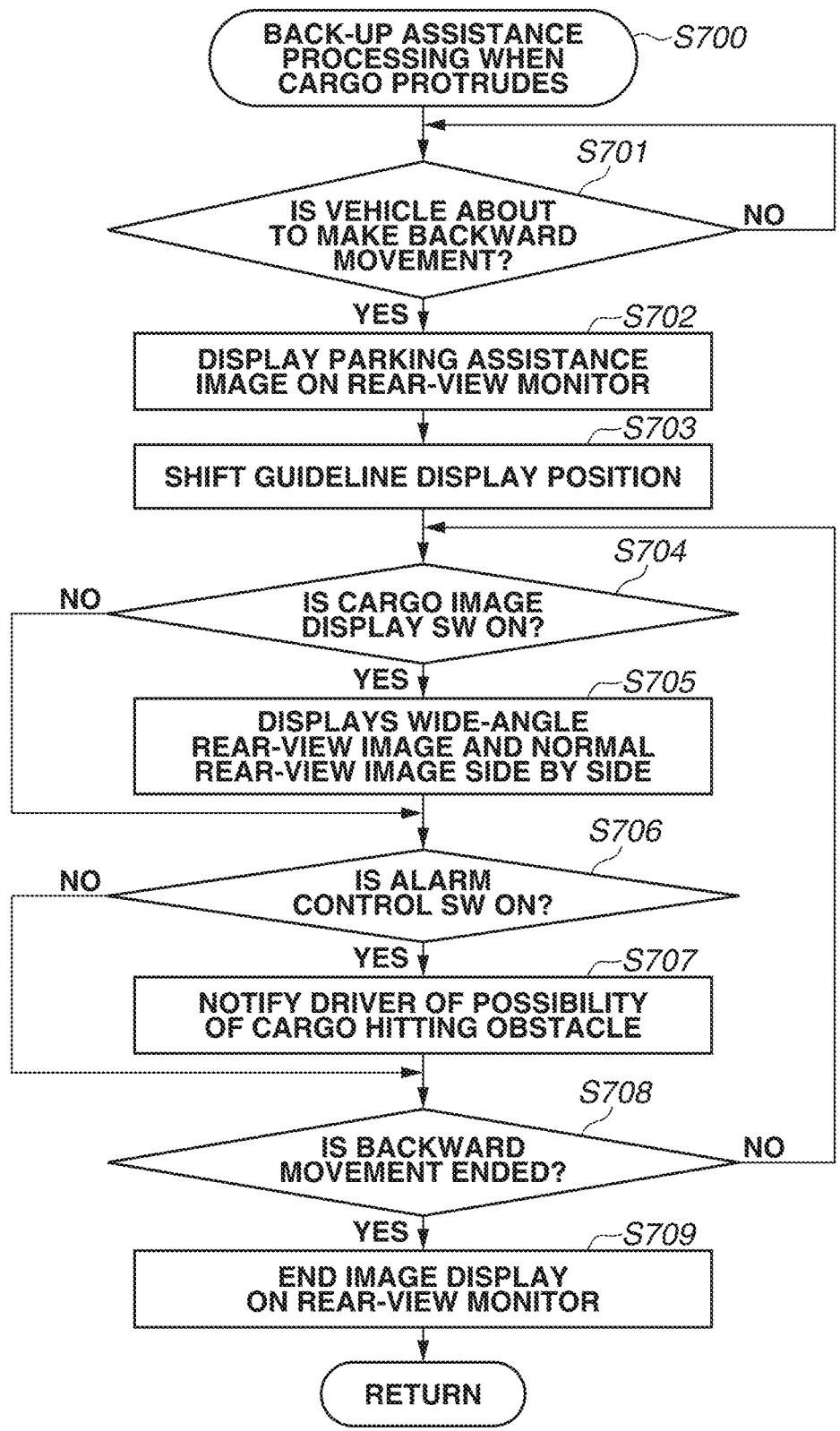
FIG. 7 is a flowchart illustrating an example of back-up assistance processing performed when the cargo protrudes rearward from the vehicle.

Based on processing of the flowcharts in FIGS. 6 and 7, when the driver 500 parks the vehicle 10, the parking assistance system displays the image of the cargo 11 loaded on the roof of the vehicle 10 and controls the display position of the guideline 234a based on the rear side protrusion amount of the cargo 11. Thus, the driver 500 can understand the perspective between the cargo 11 and the obstacle 50 behind the vehicle and it is possible to prevent the vehicle 10 from hitting the obstacle 50 behind the vehicle 10 at a time of backing up the vehicle 10.

In the above-described exemplary embodiment, the wide-angle rear-view camera 100 that can capture the image in an upper rear direction of the vehicle 10 is used. In another exemplary embodiment, a camera with an angle-of-view fixed upward can be separately mounted in addition to the generally used rear-view camera with an angle-of-view fixed downward. In this case, at a start-up time of the engine, only the camera with the angle-of-view fixed upward is turned on (step S601 in FIG. 6), and at a time of the vehicle backward movement, both of the rear-view cameras are controlled to be turned on (steps S702 and S705 in FIG. 7).

The parking assistance system according to the above-described exemplary embodiment can be applied to the rear of a vehicle as well as to the front and both and/or either side of the vehicle.

According to the parking assistance system of the above-described exemplary embodiments, in a case where a cargo on a roof of a vehicle protrudes rearward, the parking assistance system can assist a driver to appropriately perform a backward movement.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been provided, these embodiments are not seen to be limiting. The scope of the following claims is to be accorded the broadest interpretation so as to encompass all such modifications and equivalent structures and functions.

This application claims the benefit of Japanese Patent Application No. 2022-100603, filed Jun. 22, 2022, which is hereby incorporated by reference herein in its entirety.

What is claimed is:

1. A parking assistance system comprising:
a rear-view image capturing unit configured to capture an image of an upper rear area behind a vehicle;
a detection unit configured to detect information regarding a cargo on the vehicle using the captured image;
an image display unit configured to display the captured image and display a guideline for assisting parking of the vehicle in the display of the captured image; and
a guideline display control unit configured to control a display position of the guideline in the display of the captured image based on the detected information regarding the cargo.

2. The parking assistance system according to claim 1, further comprising a protrusion amount calculation unit configured to calculate a protrusion amount of the cargo protruding rearward from a rear end of the vehicle,
wherein the guideline display control unit determines the display position of the guideline based on the calculated protrusion amount.

3. The parking assistance system according to claim 2, wherein the protrusion amount calculation unit calculates an angle between a horizontal direction and a hypothetical line connecting the rear-view image capturing unit and the cargo based on the captured image, and calculates the protrusion amount based on the calculated angle.

4. The parking assistance system according to claim 3,
wherein the detection unit detects a state of how the cargo protrudes rearward from the vehicle, and
wherein the protrusion amount calculation unit determines, based on the state of how the cargo protrudes rearward from the vehicle, whether to calculate the protrusion amount based on the captured image.

5. The parking assistance system according to claim 4, further comprising a distance measurement unit configured to measure a distance to a target present behind the vehicle,
wherein the distance measurement unit calculates distances from the distance measurement unit to the cargo and to a road surface in a case where the protrusion amount calculation unit determines not to calculate the protrusion amount based on the captured image, and
wherein the protrusion amount calculation unit calculates a height distance from the road surface to the cargo based on the distances from the distance measurement unit to the cargo and to the road surface, and calculates the protrusion amount based on the calculated height distance.

6. The parking assistance system according to claim 4, wherein the detection unit detects the state of how the cargo protrudes rearward from the vehicle using the captured image.

7. The parking assistance system according to claim 4, wherein the detection unit detects the state of how the cargo protrudes rearward from the vehicle based on user input.

8. The parking assistance system according to claim 1, wherein the image display unit displays a parking assistance image, which is an image of an area behind the vehicle obtained by partially cutting out a lower portion of the captured image.

9. The parking assistance system according to claim 8, wherein the image display unit displays, in addition to the parking assistance image, a wide view angle image including at least a part of a range of the parking assistance image and a range where the cargo on the vehicle is visible in a juxtaposed manner.

10. The parking assistance system according to claim 1, further comprising an environment determination unit configured to determine whether the vehicle is about to make a backward movement,
wherein, in a case where the environment determination unit determines that the vehicle is about to make a backward movement, the detection unit determines, when a target is captured at a predetermined position in the captured image for a predetermined time period, that the target is the cargo.

11. The parking assistance system according to claim 2, wherein the protrusion amount calculation unit repeats calculation processing of the protrusion amount while the vehicle is operated and updates the protrusion amount in a case where the protrusion amount changes from the previously calculated protrusion amount.

12. The parking assistance system according to claim 1, further comprising an environment determination unit configured to determine whether the vehicle is about to make a backward movement,
wherein the detection unit determines whether a cargo is present on the vehicle based on user input to the displayed captured image in a case where the environment determination unit determines that the vehicle is about to make the backward movement.

13. A parking assistance method comprising:
capturing an image of an upper rear area behind a vehicle;
detecting information regarding a cargo on the vehicle using the captured image;
displaying the captured image;
displaying a guideline for assisting parking in the display of the captured image; and
controlling a display position of the guideline in the display of the captured image based on the detected information regarding the cargo.

14. A non-transitory computer-readable storage medium storing a program for causing a computer to execute a method, the method comprising:
capturing an image of an upper rear area behind a vehicle;
detecting information regarding a cargo on the vehicle using the captured image;
displaying the captured image;
displaying a guideline for assisting parking in the display of the captured image; and
controlling a display position of the guideline in the display of the captured image based on the detected information regarding the cargo.

* * * * *